Aug. 27, 1935. R. C. BENNER ET AL Re. 19,678

ABRASIVE WHEEL

Original Filed Feb. 27, 1931 2 Sheets-Sheet 1

INVENTORS
RAYMOND C. BENNER
HOWARD E. STOWELL

BY R. C. Benner

ATTORNEY.

ABRASIVE WHEEL

Original Filed Feb. 27, 1931 2 Sheets-Sheet 2

INVENTORS
RAYMOND C. BENNER
HOWARD E. STOWELL

BY R C Benner
ATTORNEY.

Reissued Aug. 27, 1935

Re. 19,678

UNITED STATES PATENT OFFICE 19,678

ABRASIVE WHEEL

Raymond C. Benner and Howard E. Stowell, Niagara Falls, N. Y., assignors to The Carborundum Company, Niagara Falls, N. Y., a corporation of Pennsylvania Original No. 1,982,628, dated December 4, 1934, Serial No. 518,733, February 27, 1931. Application for reissue July 9, 1935, Serial No. 30,522

7 Claims. (Cl. 51—207)

This invention relates to the manufacture of abrasive wheels for the production of ground wood pulp, and particularly to wheels produced by the bonding of abrasive grains.

The object of the invention is to produce a manufactured grindstone that possesses the desirable properties and is free from the undesirable characteristics of the natural sandstones and the stones manufactured in accordance with methods hitherto known.

Various methods have been employed in the manufacture of pulp grinding wheels and among them was one comprising the mounting of blocks of bonded abrasive material upon a metal drum. Other methods have included the joining of blocks by a cement to form a hollow cylinder of abrasive material. These methods have been partially satisfactory but not entirely so, because in the former method the cost of the metal drums and the expense of remounting blocks when one set wore out was excessive, while in the latter method difficulties were encountered in clamping and driving the hollow cylinders.

The wheels made by joining blocks to form a hollow cylinder formerly were mounted between iron or steel flanges which were screwed onto an iron or steel shaft and which held and drove the wheel by virtue of the pressure they exerted directly upon the abrasive cylinder itself. Gaskets of various materials have failed to give proper protection to the abrasive cylinder due to the heavy pressures exerted and the consequent rigidity developed in the gasket material.

The combined effect of the temperature developed and the constant torsional load produced by the applied pressure of grinding has been an angular displacement of the flanges on the grinder shaft, which caused them to grip the abrasive cylinder tightly under high temperature conditions. Upon cooling to normal temperatures, excessive flange pressure resulted because of the higher coefficient of expansion of the shaft; moreover, bonded abrasive material and steel absorb or give up heat at greatly different rates and since the steel is the faster to absorb or give up heat, the bonded abrasive is subjected to greater pressures than would be the case if both the steel and the abrasive were heated and cooled at the same rate.

In carrying out our invention, we make a portion of the wheel of a material that has substantially the same thermal coefficient of expansion as the metal of the shaft and flanges and we cause the flanges to engage that portion and provide a compensating medium between the abrasive body and each flange to permit the different parts to expand at different rates without producing undue pressures. We also provide a compensating joint between the abrasive portion and the portion whose thermal coefficient of expansion is the same as that of the shaft and flanges.

The present invention is illustrated by the attached drawings in which.

Figure 1:
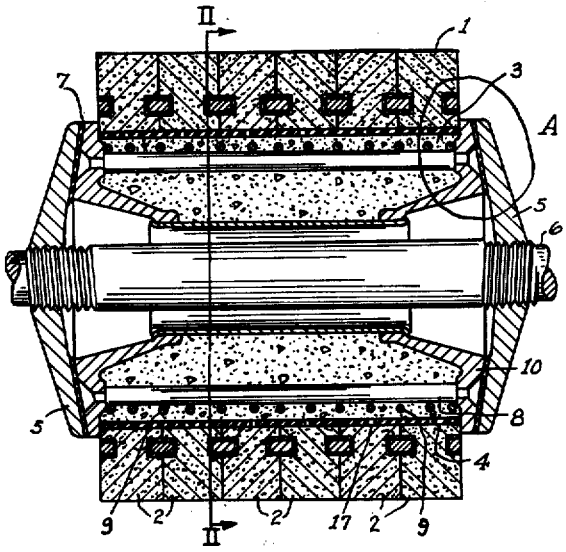
Figure 1 shows a cross-sectional view through a diameter of an abrasive wheel mounted for operation on a shaft of a pulp grinding machine.

The wheel illustrated by Figure 1 comprises an outer body 1 of abrasive annuli 2 and an inner portion 3 of a material whose thermal coefficient of expansion is substantially the same as that of the shaft and flanges, and a layer of resilient material 4 between the annuli 2 and the inner portion 3. The wheel is held between the driving flanges 5 which are in threaded engagement with the driving shaft 6. The grouting 7, shown between each flange and the metal facing 10 of the central portion of the wheel, serves to compensate for any irregularities in the surfaces of the central portion of the wheel or the flanges. Annular metal reinforcements 18 for the abrasive wheel are shown in section in Figure 1 and exemplified in side view in Figure 2.

Figure 2:
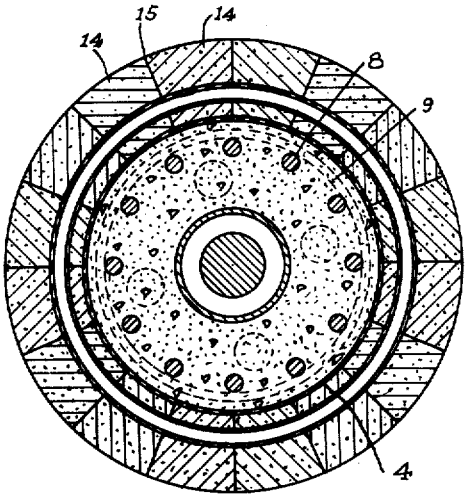
Figure 2 is a sectional view through the line II—II of Figure 1.
Figure 1A:
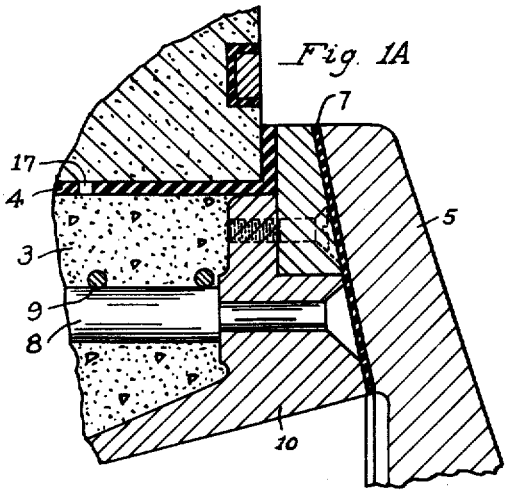
Figure 1A is an enlargement of the portion of Figure 1 included within the line A.

In the modification shown in Figures 1 and 2, the abrasive annuli 2 consist of wedge shaped blocks 14 of bonded abrasive material joined by means of a resilient cement 15. The inner portion 3 of the wheel is shown with reinforcing members 8 and 9 that may be omitted if not required. The inner portion 3 and the outer abrasive portion 1 are separated by a resilient cement 4. Holes 17 are shown (e. g. Figures 1 and 1A) in the resilient cement. These holes serve to make this layer of cement more yielding than it would otherwise be.

Figure 3:
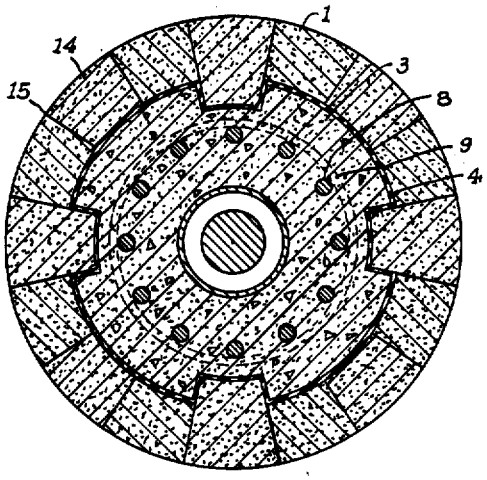
Figure 3 shows a transverse section (perpendicular to the axis of rotation) of a wheel embodying another modification of our invention.

The abrasive annuli shown in Figure 3 comprise abrasive blocks of different lengths, whereby the abrasive body and the inner body interlock and form a positive driving engagement.

Resilient cement, impregnated paper, or similar yieldable material 4 is shown between the abrasive body and the inner concrete body.

Figure 4:
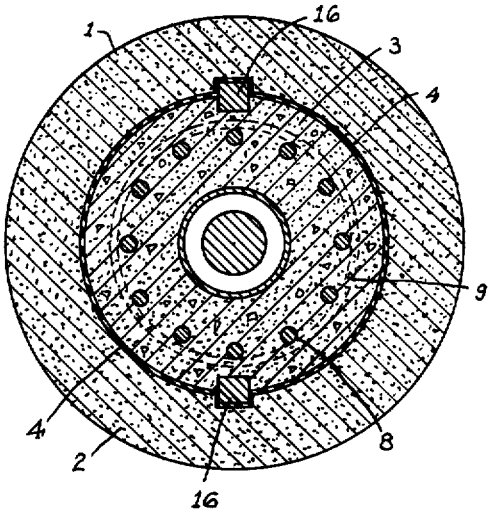
Figures 4 and 5 show respectively transverse sections of wheels embodying still other modifications of our invention.

Figure 4 shows a modification in which keys 16 are inserted in registering grooves of the abrasive body and the inner concrete body and resilient material 4 is used wherever the abrasive material and the keys are adjacent.

Figure 5:
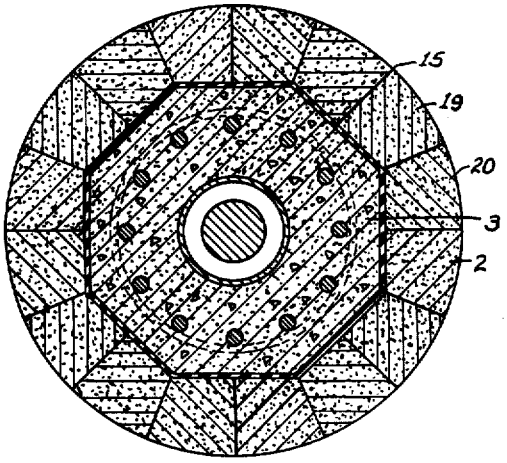

Figure 5 shows the central portion 3 as of octagonal shape. A central portion having an octagonal shape as shown is of material assistance in transferring rotational movement from the shaft to the wheel. Other shapes, such as triangular, square, pentagonal or hexagonal, also are useful. The central portion 3 is surrounded by abrasive annuli 2 made up of bonded abrasive blocks 19 and 20 joined by means of the cement 15.

In constructing a wheel in accordance with our invention, we first produce an abrasive body of the desired size, shape, and characteristics. This we do by forming a mixture of abrasive grain and bond into blocks, annuli or cylinders, of the desired shape. Various materials are useful as cementing media for the blocks or annuli. Among them are rubber compounds as disclosed in part in copending application, Serial No. 484,545, filed September 26, 1930, comprising rubber, sulphur, vulcanization accelerator and filling materials and anti-oxidants as required, and resinous compounds comprising a resin or number of resins and inert fillers as required, which, when cured, produce joint materials that have thermal and physical characteristics (i. e., thermal expansion rates and resiliency) that keep within safe limits all internal stresses resulting from temperature changes within the limits of −40 degrees Fahrenheit and 212 degrees Fahrenheit, and the stresses due to operating under load under all practicable operating temperatures .

According to one method we employ in providing the abrasive body with a central portion, we form the central and outer portions separately and join them to form the abrasive wheel. Great care is exercised in joining the abrasive body and the central body, in order to provide against rupture of the wheel from thermal stresses. We provide a compensating medium of such thickness and of such material that it is sufficiently yieldable to prevent the introduction of undue strains when the inner and outer bodies expand or contract different amounts respectively for a given temperature change. This compensating joint is of such material that it will absorb not only the strains set up by the inner and outer bodies but also will absorb any tendency of its own to set up strains because of its difference in coefficient of thermal expansion from that of the materials it serves to join.

We have found that a cylinder of a material having a coefficient of expansion approximating that of steel will change from a diameter of 42.0000 inches to a diameter of 42.0357 inches when it is heated from 70 degrees Fahrenheit to 212 degrees Fahrenheit, whereas the inner diameter of a typical bonded abrasive cylinder will change from 42.0000 inches to 42.0163 inches when heated the same amount; thus, the compensating material between cylinders whose inside and outside diameters respectively are approximately 42 inches should be of such thickness and nature that it will compress at least 0.01 inch when the stress applied is less than that required to rupture the abrasive body.

A layer approximately one eighth of an inch thick of a cement composed of

| | Parts |
|---|---|
| Smoked sheet rubber | 75 |
| Sulphur | 4.5 |
| Thiocarbanalid | 2.5 |
| ZnO | 37.5 |
| Lampblack | 4.75 |
| Carbon | 11.75 |
| Mineral rubber | 3.00 |

has been found to be suitable for a joint material between a typical abrasive body whose inner diameter is 42 inches and a central member of substantially the same outer diameter, or, for example, 41.75 inches.

Other compounds than that illustrated above may be used between the abrasive body and the central portion; for example, a harder rubber compound comprising

| | Parts by weight |
|---|---|
| Smoked sheet rubber | 80 |
| Sulphur | 15 |
| Calcined magnesia | 6 |
| Zinc oxide | 100 |
| Carbon black | 4 |
| Barytes | 5 |
| Aniline oil | 2.5 |
| Cocoa oil | 7 |

may be used in place of the material disclosed above. This harder rubber cures to a firm product in approximately two hours when heated to a temperature of approximately 320 degrees Fahrenheit.

By way of illustration, we describe one method by which the inner and outer bodies are joined according to our invention. The abrasive body and the central body having been formed, the surfaces to be joined are first primed with a benzol solution of modified rubber known as "Vulcalock" and then covered with a coat of cement approximately one eighth of an inch thick composed of the rubber composition given above.

The central member is then placed within the abrasive body and cement is rammed into the joint to insure complete filling of the space between the two bodies. The cement joint is cured by heating the wheel to approximately 287 degrees Fahrenheit, and holding it at this temperature for approximately 40 to 60 minutes. It will be understood by those skilled in the art that heat travels slowly through abrasive or cement bodies and that, consequently, it is necessary to allow a longer period of time for large wheels to reach the curing temperature than is required for small wheels.

Among the materials that we have found suitable for the central members are a lime bonded sand, crystalline alumina granules bonded with a phenolic condensation resin, sand or gravel bonded with Portland cement, and a mixture of crystalline alumina and rutile granules bonded with a glass.

A specific example of a method of making a central portion of crystalline alumina bonded with a phenolic condensation resin is as follows:

The granular alumina is wetted with approximately 1.5 grams of a mixture containing 40 parts cresol and 60 parts furfural to each 100 grams of grain and then mixed with a phenolic condensation resin in the ratio of 87 parts by weight of grain to 9 parts by weight of resin. This mixture is then formed by tamping, pressing or jolting into the desired form and then cured by heating to approximately 350 degrees Fahrenheit.

This material, when cured, has a thermal coefficient of expansion of approximately $12.88 \times 10^{-6}$ per degree centigrade.

The rutile-alumina-glass center referred to above comprises approximately 70 parts (by weight) of granular rutile, 5 parts (by weight) of 80 mesh crystalline alumina and glass containing

| | Percent |
|---|---|
| $SiO_2$ | 67.0 |
| $B_2O_3$ | 3.5 |
| $Na_2O$ | 12.0 |
| $K_2O$ | 5.0 |
| BaO | 10.6 |
| ZnO | 1.5 |
| $Al_2O_3$ | .4 |

This mixture is formed into the desired shape by pressing, tamping or jolting, and is then cured by burning at a temperature of approximately 1,000 degrees centigrade. When cured, this material has a thermal coefficient of expansion of approximately $10.8 \times 10^{-6}$ per degree centigrade.

One modification of the above process, that sometimes is desirable, consists in forming a concrete center within the abrasive body instead of using a preformed body within the abrasive body. This modification is particularly convenient in those modifications in which the inner surface of the abrasive body is irregular, as for example in the modifications shown in Figures 3, 4 and 5.

In constructing wheels of the type shown in Figures 3, 4 and 5, the abrasive body is formed in the same manner as heretofore disclosed, but the compensating material is inserted before the cement body is placed within the abrasive body.

The modification shown in Figure 4 discloses the use of keyways in the abrasive body and the concrete body. The keys used in these keyways are made of metal, the cement mixture, abrasive material, or other materials, according to the requirements of the particular wheel being constructed. In building a wheel in accordance with our invention, we provide a compensating medium wherever the abrasive body is adjacent to any other material.

While we have given detailed methods of constructing wheels according to our invention, it is not intended to limit our invention to those particular details or sequence of steps, nor is it intended to limit our invention to the use of the specific materials disclosed in this specification.

Having thus described our invention, what we claim is:

1. An abrasive wheel comprising a central portion containing granular rutile, granular crystalline alumina and glass, an abrasive portion surrounding said central portion and a vulcanized rubber compound joining said central and outer portions, said central portion having substantially the same coefficient of expansion as the driving shaft.

2. Apparatus for grinding wood pulp comprising in combination a driving shaft, two driving flanges mounted in respective right-threaded and left-threaded engagement with said driving shaft, a non-metallic core for supporting an abrasive wheel mounted between said driving flanges and having a coefficient of expansion substantially equal to that of the driving shaft, an end bearing between each of said driving flanges and the adjacent side of the wheel, said bearings being so disposed with respect to said core that the major portion of the thrust exerted by the flanges is impressed on the core, and an abrasive annulus mounted on said core by means of a resilient cement which has been toughened by heat, the axial pressure exerted by the driving flanges on the core automatically increasing with the load on the abrasive wheel.

3. The apparatus described in claim 2 in which the body of the core is composed of siliceous material bonded with Portland cement.

4. The apparatus described in claim 2 in which the body of the core is composed of crystalline alumina bonded with a phenolic condensation resin.

5. The apparatus described in claim 2 in which the body of the core is composed of a mixture of crystalline alumina and rutile granules bonded with a glass.

6. A pulp wheel assembly comprising in combination an abrasive annulus, a driving shaft for said annulus extending through the annulus, a core disposed between said shaft and said abrasive annulus and having a coefficient of expansion substantially equal to that of the driving shaft but different from that of the abrasive member, a driving flange mounted at each end of said abrasive wheel, said driving flanges having respective right-hand and left-hand threaded engagement with said driving shaft and mounted to exert the major portion of their thrust and driving torque on the ends of said core, and a thin layer of resilient cement between said core and said abrasive annulus to compensate for differences of expansion between said abrasive annulus and said core.

7. The pulp wheel assembly described in claim 6 in which end bearings are provided between each flange and the adjacent end of the core, and reinforcing members extend through the core between the end bearings.

RAYMOND C. BENNER.
HOWARD E. STOWELL.